3,269,859
COMPOSITION FOR IMPREGNATION OF LEATHER AND RESULTING PRODUCTS

Italo V. Mattei, Philadelphia, Frank J. Glavis, Elkins Park, and John A. Lowell, Philadelphia, Pa., assignors to Rohm & Haas Company, Philadelphia, Pa., a corporation of Delaware
No Drawing. Filed May 9, 1963, Ser. No. 279,318
17 Claims. (Cl. 117—142)

The present invention is concerned with a process and compositions for the impregnation of leather for the purpose of improving the break and in preferred instances, the scuff resistance thereof.

An application for United States Letters Patent by Lowell et al., Serial No. 80,742 filed January 5, 1961, now Patent No. 3,103,447, discloses and claims the impregnation of leather with water-soluble ammonium or amine salts of certain acid copolymers. Another application for United States Letters Patent Serial No. 221,439, filed September 5, 1962, discloses and claims the impregnation of leather with aqueous dispersions of certain water-insoluble polymers containing a surface-active agent.

In accordance with the present invention, it has surprisingly been found that decided advantages are attainable by impregnating leather with a mixture, in a weight ratio of 15:85 to 85:15, of (1) a water-soluble addition polymer and (2) a dispersed, water-insoluble linear addition polymer, the size of the dispersed particles thereof being such that they have a surface average radius from about 250 to about 2200, and preferably about 500 to 1300, angstrom units. As compared to the impregnation with the water-soluble copolymer salt of the first-mentioned application as the essential impregnant, impregnation with the mixture of the present invention provides improved control of leather temper, higher grain strength, and also improved "deep-break" properties. As compared to impregnation with the dispersed water-insoluble polymer as the essential impregnant, the leather obtained on impregnation with the mixture in accordance with the present invention provides markedly better improvement in the overall break properties of the leather. It has been found that the process and compositions of the present invention provide an optimum combination of desirable properties in the finished leather, particularly in respect to retention and control of leather temper and grain strength properties, and improvement in break including reduction in the depth of break, for a given amount of impregnant solids deposited in the leather.

Furthermore, the manner of application of the compositions of the present invention is not as critical as in the application of dispersed water-insoluble polymers described in the second patent application mentioned supra. For example, the compositions of the present invention are more amenable to application by seasoning machines, the mechanical shearing action of which frequently causes breakdown of polymer dispersions. In general, it has been found that the compositions of the present invention do not suffer such breakdown. Furthermore, the action within the leather during absorption of the impregnant from the aqueous medium containing it apparently favors greater depth of absorption and greater uniformity of absorption when the compositions of the present invention are employed especially when compared to the action of the water-soluble copolymer salts.

Advantages of the present invention over the previous application of water-soluble copolymers include the fact that the impregnant may have higher concentrations without encountering application difficulties involving excessive viscosity; it is possible to obtain adequate resistance to removal of the polymeric impregnant by water even though a water-soluble component of the composition of the present invention would be too water-soluble if used alone; these alkali metal salts, and even alkaline earth metal salts to the extent they are soluble, of polymerized acids can be used even though their bases lack the volatility of ammonia and amines, making it possible to benefit from the anti-foaming action of these metal salts; and the compositions used in the present invention can be applied in acid, neutral, or alkaline media.

Advantages of the present invention over the previously recommended impregnation solely with a dispersed water-insoluble polymer include the fact that the mixed composition drives more readily into the depths of the leather, apparently because of protective colloid action preventing discharge at or near the surface; dispersed polymer may have larger particle size; more thorough and uniform distribution of polymer through the thickness of the leather that is impregnated because of the greater diversity of particle sizes in the impregnating composition; more versatility in that the greater stability of the composition enables it to be applied on a wider variety of equipment including types where severe mechanical stresses would preclude the use of a composition consisting exclusively of a dispersed polymer because of the tendency of the latter to coagulate under such stresses; the mixed composition has greater tolerance to organic solvents, such as alcohols, ethers, esters, and ketones, which are frequently advantageous to use because of their ability to facilitate wetting and penetration of the leather by the composition.

Another outstanding advantage is the amenability of the mixed compositions to being buffered at any point in a rather wide range of pH. Such buffering is especially useful in certain situations to prevent zwitterions of the leather protein and/or tannins from discharging too soon the charge of the colloidally dispersed polymer. This also facilitates the uniform impregnation of the leather. An outstanding advantage of the use of a mixed or blend composition according to the present invention is the greater ease of control of the balance of hydrophobicity and hydrophilicity obtainable from a wider variety of water-soluble and of water-insoluble polymers.

The compositions applied in accordance with the present invention are aqueous dispersions of (1) a water-soluble homopolymer or a copolymer of monoethylenically unsaturated molecules comprising at least about 3% and preferably about 10 to 35% by weight of at least one monomer having a hydrophilic group selected from the group consisting of OH, amide, amine (or salts of the amine substituents), quaternary ammonium hydroxide and salt groups, and COOH groups (and $NH_4$ alkali metals, and amine salts or partial salts of the COOH groups), and (2) a solid, water-insoluble linear addition polymer having polymer particle sizes such that they have a surface average radius from about 250 to about 2200 angstrom units. The pH of the impregnating composition may be in the range of about 3 to 9, but 6 to 8 is preferred. The concentration of the impregnating composition is from about 5% to about 25% or more by weight when applied. However, under the conditions of application, the viscosity of the impregnating composition should not exceed about 30 centipoises and is preferably not over 20 centipoises. This essential upper limit of permissible viscosity may in some instances limit the conditions of application of a given composition to a portion only of the pH range mentioned, to a portion only of the concentration range given, or to a temperature above room temperature.

The relative proportions of the polymer (1) and polymer (2) are from about 15:85 to about 85:15 weight ratio and preferably from 25:75 to 75:25, an approximately 50:50 weight ratio often being the optimum.

The invention is concerned with the impregnation of fully tanned leathers which have been fat-liquored but are unstuffed and unifinished except that they may be stained or dyed. The leather to be treated should be in a dry condition. While it may be "bone-dry" or anhydrous, it is preferably in an air-dried condition, that is a condition in which it has a moisture content in equilibrium with the ambient atmosphere or conventional conditioning atmospheres having a temperature of 65 to 75° F. and a relative humidity of 60 to 70%. The moisture content of an "air-dry" leather may be about 10% or more or less depending upon the particular leather, its tanning history, and so on.

The size of the dispersed particles of the insoluble polymer to be applied is important. The 2200 angstrom upper limit applies particularly to shearlings and split leather, whereas for full-grain leathers, it generally is desirable to keep well below the 2200 limit, such as below about 1800 angstroms or even below 1500 angstroms to assure adequate penetration of the dispersed polymer. If the size of a large proportion of these particles appreciably exceeds the upper limits defined, the undissolved, dispersed polymer particles would serve primarily to coat the surface of the leather since most of these polymer particles would be too large to penetrate through the pores of the leather which on the grain side of full grain leather are quite small in comparison to the flesh side. It is essential that in most cases these polymer particles are sufficiently small to penetrate the pores of the corium minor; otherwise the improvement resulting from the application of the mixed soluble/insoluble polymers cannot be attained even if the polymer dispersion is held in contact with the leather for prolonged periods of time and a large amount of the dispersion is applied. The latter would merely increase the coating without enhancing the penetration simply because of the rapid clogging of the pore openings with the numerous large size particles present which would interfere with the entry of the soluble polymer into the corium minor of the leather as well as the insoluble polymer. It is well known how to obtain relatively small particle size polymer dispersions by emulsion polymerization, such as by the use of relatively large amounts of emulsifier. When the monomers used tend to produce molecular weights so high that the particle size limits defined are exceeded, the use of chain transfer agents to reduce the molecular size may be resorted to. No claim is made herein to any particular method for obtaining the polymer dispersions since many such methods are well known to the workers in the polymerization art.

The water-solubility of the component (1) depends on the content of hydrophilic groups therein. Examples of monomers providing hydroxyl groups in a homopolymer or copolymer include β-hydroxyethyl acrylate, β-hydroxyethyl vinyl ether or sulfide, N - β - hydroxyethylacrylamide, N-methylol-acrylamide or N-methylolmethacrylamide. Examples of hydrophilic monomers providing an amine group are 4-vinylpyridine, β-aminoethyl vinyl ether or sulfide, β-aminoethyl acrylate, N-β-aminoethylacrylamide, and N - β - aminoethylmethacrylamide. The amines are especially adaptable for use in the compositions having a pH on the acid side. Examples of amides include acrylamide, methacrylamide, N-methylacrylamide, N - methylolacrylamide, N - methylolmethacrylamide, N - methoxymethylacrylamide, fumaramide, and N-vinylpyrrolidione. Examples of acids that may be used to provide free carboxyl or carboxylate salt groups include arcylic acid, methacrylic acid, itaconic acid, citraconic acid, mesaconic acid, maleic acid, and fumaric acid. These acids are particularly useful when the compositions are used at a pH on the alkaline side, though if partially neutralized, such as with ammonium, sodium, potassium, or magnesium hydroxide, or a water-soluble amine, their copolymers may still be water-soluble even at a pH as low as about 6 to 6.5. Examples of monomers having a plurality of different hydrophilic groups include N-methylolacrylamide, maleamic acid, itaconamic acid, and fumaramic acid. A plurality of monomers each having a different type of hydrophilic group may be copolymerized into a single copolymer. In general, the total amount of hydrophilic units in the polymer should be at least 3% and is preferably in the range of about 10% to 35% by weight of the polymer, but, of course, hydrophilic homopolymers may be used as well as copolymers.

The total concentration of the water-soluble and dispersed polymers in the aqueous composition should be in the range of about 5% to about 25%; generally a concentration of about 8 to 15% is preferred. The composition is applied to one side only and the extent of impregnation should be such as to deposit, within a layer of the leather amounting to 15% to 45% of the total thickness of the leather, at least about 0.7% to about 12% by weight of polymer, based on the air-dried weight of the leather.

In the water-soluble component, the hydrophilic monomer or monomers can be copolymerized with other less hydrophilic or less polar monomers, such as the saturated monohydric aliphatic alcohol esters of acrylic or methacrylic acid obtained from cyclohexanol or alkanols having 1 to 18 carbon atoms, vinyl esters of a fatty acid having from 1 to 18 carbon atoms such as vinyl acetate, vinyl laurate, or vinyl stearate, vinyl chloride, vinylidene chloride, styrene, vinyltoluene, acrylonitrile and methacrylonitrile.

In order to assure that the composition including both the water-soluble polymer and the insoluble polymer is capable of effective penetration of the leather, it is essential that the composition does not have a viscosity greater than about 30 centipoises under the conditions of use for impregnation including temperature and concentration of the polymer components.

The water-soluble polymers may be made in any conventional way, such as by copolymerizing the mixture of hydrophilic monomer and other monomer by a conventional dispersion or a conventional solution technique. Regardless of the procedure of polymerization that is employed, the molecular weight may be controlled by the use of conventional techniques, e.g., the employment of a chain regulator such as a long-chain mercaptan or a chloro-hydrocarbon such as bromotrichloromethane, the amount of the chain regulator being employed to provide the molecular weight within the range specified hereinabove.

Preferred water-soluble copolymers are the ammonium or volatile amine salts of copolymers containing at least 3% and preferably about 10% to 35% by weight of an α,β-monoethylenically unsaturated acid. These preferred copolymers may be made in conventional fashion by copolymerizing the acids and other monomer or monomers by a conventional dispersion technique after which the acid copolymers may be converted to the salt form by the addition of ammonium hydroxide or a water-soluble amine such as triethylamine. While any volatile water-soluble amine may be employed, it is generally preferable and most economical to use ammonium hydroxide. Alternatively, the acid may be copolymerized with the other monomer in an aqueous solution thereof which includes a water-miscible solvent to dissolve the monomers. The prepared polymer solution is then converted to the amomnium or amine salt by diluting with an aqueous solution of the appropriate base.

While any copolymerizable unsaturated acid, such as acrylic acid, itaconic acid, aconitic acid, maleic acid, or fumaric acid, may be employed in making the acid (or salt) type of water-soluble copolymers, the use of methacrylic acid is preferred because of its copolymerization properties which lead to the formation of copolymers of ready solubility in dilute aqueous solution of ammonium hydroxide or amines with subsequent outstanding leather penetrability by the aqueous polymer salt solution obtained therefrom.

Any homopolymer or copolymer can be used as component (2) as long as it is not water-soluble under the pH conditions at which the composition is applied to the leather and provided it meets the other requirements of particle size. Polymers that are suitable include linear addition polymers of either thermoplastic or thermosettable type. They may be homopolymers or copolymers. In general, they are polymers of monoethylenically unsaturated molecules, though they may also contain substantial proportions of polyethylenically unsaturated molecules when such molecules are adapted to produce polymers of essentially linear, rather than cross-linked type. Thus, linear polymers of isoprene, chloroprene, and butadiene including synthetic rubber latices having appropriate particle size may be used. However, such rubber polymers are subject to deterioration on exposure to ultraviolet light and oxygen so that it is generally preferable to employ polymers of acrylic type, especially the esters, nitriles and amides of acrylic or methacrylic acid. The most important group of acrylic ester polymers are those obtained by the addition polymerization of at least one ester of an acid of the formula

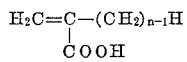

in which $n$ is an integer having a value of 1 to 3, with an alcohol lacking ethylenic unsaturation and having 1 to 18 carbon atoms, such as benzyl alcohol or saturated aliphatic monohydric alcohols having 1 to 18 carbon atoms, such as cyclohexanol, alkyl-substituted cyclohexanols, and $(C_1-C_{18})$-alkanols. Examples of suitable polymers include polymethyl acrylate, polyethyl acrylate, polybuty acrylate, and other homopolymers and copolymers of esters of acrylic acid with an alkanol having 1 to 18 carbon atoms and of methacrylic acid with an alkanol having 5 to 18 carbon atoms; also such esters substituted by chlorine and/or fluorine atoms. The copolymers may also include acrylonitrile, methacrylonitrile, styrene, vinyltoluene, vinyl acetate, vinyl chloride, vinylidene chloride, vinyl $(C_1-C_4)$-akyl ethers, and esters of methacrylic acid with an alkanol having 1 to 4 carbon atoms.

The insoluble copolymers may contain about 0.5 to 15% of units derived from hydrophilic monomers containing a group having a reactive hydrogen as determined by the Zerewitinoff method, Ber., 40, 2023 (1907); 41, 2236 (1908); Kohler, J.A.C.S., 49, 3181 (1927)—provided the copolymers are water-insoluble at the pH condition of usage. Examples include acrylamide, methacrylamide, N-methylolacrylamide, acrylic acid, methacrylic acid, itaconic acid, β-hydroxyethyl acrylate, tert-butylaminoethyl methacrylate, hydroxyethyl vinyl ether or sulfide, glycidyl methacrylate.

A more specific group of insoluble copolymers are those of a mixture of monoethylenically unsaturated molecules comprising about 0.5% to 4% of an acid of the group consisting of acrylic acid, methacrylic acid, and itaconic acid, and 96 to 99.5% by weight of at least one ester of an acid of the formula

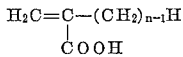

in which $n$ is an integer having a value of 1 to 3, with a saturated monohydric alcohol having 1 to 18 carbon atoms. The entire ester component may be composed of an ester of acrylic acid with any alkanol having from 1 to 18 carbon atoms or of an ester of methacrylic acid with an alkanol having 5 to 18 carbon atoms.

The composition of the polymers, both the water-soluble and the water-insoluble components, determine the flexibility or stiffness obtained in the product. When ethyl acrylate or an acrylic acid ester of an alcohol having three or more carbon atoms is the ester employed, highly flexible products are obtained without the use of plasticizers, and as the alkanol increases in size, the flexibility generally increases. Thus, n-butyl acrylate produces a copolymer somewhat more flexible than the ethyl acrylate for a given molar ratio of ester in the copolymer. When methyl acrylate or a methacrylic acid ester of a lower alkanol having 1 to 3 carbon atoms is employed as part of the copolymer, the products obtained increase in stiffness as the amounts of these components increase. Vinyl acetate also tends to produce a relatively stiff product, but higher vinyl esters such as vinyl butyrate are capable of producing relatively flexible products. Methacrylic acid esters with alkanols having 4 or more carbon atoms may be employed, and they give products which are more flexible than the products obtained with the lower alkyl methacrylates. Of course, the esters may be mixed in various proportions to provide variations in flexibility and stiffness as well as other properties. For example, there may be employed a copolymer containing both ethyl acrylate or butyl acrylate with methyl methacrylate to provide somewhat greater stiffness than would be obtained without the methyl methacrylate. Valuable copolymers are also obtained from mixtures of the acid monomer with ethyl acrylate or butyl acrylate in admixture with acrylonitrile, vinylidene chloride, vinyl chloride, and so on. As stated, flexibility and stiffness of the polymer can be governed by the water-soluble, as well as the water-insoluble, polymer components used and the ratios in which they are used. For example, a polyvinyl alcohol polymer (which would produce a hard, stiff film) can be softened considerably by mixing it in minor proportions with a major component of a polybutyl acrylate dispersion polymer. The same is true of a mixture of polyacrylic acid and polybutyl acrylate dispersion polymer or a hard water-soluble copolymer and polybutyl acrylate dispersion polymer. The hardness of the polymer mixture is such that the dried cast film of the polymer mixture has a torsional modulus (herein referred to as T.M.) of about 0.5 to 400 kg./cm.$^2$ at 25° C. and is in a preferred range of 1 to 100 kg./cm.$^2$.

The composition may be prepared by separately preparing (1) a solution of the water-soluble polymer, such as by solution polymerization in water and (2) a dispersion in an aqueous medium of the insoluble polymer, as by emulsion polymerization and mixing the resulting solution and dispersion to provide the proper ratio between the two polymer components. The dispersion of the insoluble polymer may be prepared from an emulsified monomer or mixture of monomers or it may be prepared without the use of an emulsifier, as by the use of a persulfate catalyst. When an emulsifier is used, it may be of anionic or non-ionic types, or a mixture thereof. Examples of anionic emulsifying agents include the higher fatty alcohol sulfates, such as sodium lauryl sulfate, alkylaryl sulfonates, e.g., sodium or potassium isopropylbenzene sulfonates or isopropyl naphthalene sulfonates, alkali metal higher alkyl sulfosuccinates, e.g., sodium octyl sulfosuccinate, sodium N-methyl-N-palmitoyllaurate, sodium oleyl isothionate, alkali metal salts of alkylarylpolyethoxyethanol sulfates or sulfonates, e.g., sodium t-octylphenoxypolyethoxyethyl sulfate having 1 to 5 oxyethylene units.

Alternatively, the water-soluble polymer may also be prepared by emulsion polymerization in any of the ways just described to form a latex or dispersion containing a water-insoluble polymer, such as a copolymer of an unsaturated acid or of an amine-containing monomer, in which latices the copolymers can be converted to water-soluble form by partial or total neutralization, as with a base (e.g. alkali metal or ammonium hydroxide or an amine) in the case of the acid copolymer or an acid (e.g. hydrochloric, sulfuric, acetic) in the case of the amine copolymer. The neutralization (partial or complete) may be effected before, during, or after mixing this latex with the dispersion of the water-insoluble copolymer which remains water-insoluble regardless of pH.

When the dispersed polymer is to contain basic groups, such as amine or quaternary ammonium groups, a mixture of cationic and non-ionic emulsifiers is generally preferred. Suitable cationic emulsifying agents include laurylpyridinium chlorides, cetyldimethylamine acetate, and alkyldimethylbenzylammonium chlorides in which the alkyl group has from 8 to 18 carbon atoms, such as octyl, decyl, dodecyl, or octadecyl, and t-octylphenoxyethoxydimethylbenzylammonium chloride.

Suitable non-ionic emulsifying agents include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxylpolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans, or with alkylthiophenols having alkyl groups of 6 to 15 carbon atoms; ethylene oxide derivatives of long-chained carboxylic acids, such as lauric, myristic, palmitic, oleic, ricinoleic and the like or mixtures of acids such as found in tall oil containing 6 to 60 oxyethylene units per molecule; analogous ethylene oxide condensates of long-chained alcohols, such as castor oil or octyl decyl, lauryl, or cetyl alcohols, ethylene oxide derivatives or etherified or esterified polyhydroxy compounds having a hydrophobic hydrocarbon chain, such as sorbitan monostearate containing 6 to 60 oxyethylene units, etc.; also ethylene oxide condensates of long-chain or branched chain amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hydrophilic ethylene oxide sections.

The dispersed insoluble polymers may be prepared in any suitable fashion and may have any molecular weight, such as from about 30,000 to 10,000,000 viscosity average. Such polymers are readily produced by emulsion polymerization in an aqueous medium which may or may not contain a chain transfer agent, depending on the molecular weight desired. The conditions of polymerization should be those which produce an aqueous dispersion of the polymer with a particle size in the range specified hereinabove.

The compositions should be capable of forming a continuous film at the temperature of application though, when improved abrasion and scuff resistance is desired, as well as improvement in break properties (including reduction in depth of break) with retention of good leather temper and grain strength properties, it is necessary that the dried film of the polymer composition have a T.M. not in excess of about 400 kg./cm.$^2$ at 25° C. and it preferably has a T.M. of about 1 to 100 kg./cm.$^2$ at 25° C. When scuff resistance is desired, the higher the T.M. of the polymer composition the better the scuff resistance and this particularly true for compositions having higher proportions of water-soluble polymers. Of course, lower T.M. compositions can be used regardless of the relative proportions between the soluble and insoluble copolymers for improving scuff resistance as long as the T.M. of a dried film of the compositions is at least about 0.5 kg./cm.$^2$ at 25° C.

Penetration may also be accelerated by adding a water-miscible organic solvent to the aqueous polymer composition. The solvents that may be used include cyclic ethers, alcohols, ketones, esters, and mixed alcohol ethers. Examples include ethyl alcohol, methyl alcohol, isopropyl alcohol, tetrahydrofurfuryl alcohol, or t-butyl alcohol. Examples of ketones include acetone and methyl ethyl ketone. Examples of ethers include dioxane and tetrahydrofuran. Examples of esters include ethyl acetate and methyl acetate. Examples of ether-alcohols include diethylene glycol, and the monomethyl and monoethyl ether thereof.

The particular solvent may be composed of a single solvent material or it may be composed of a mixture of any of the materials mentioned hereinabove. Naturally, the particular solvent employed depends upon the components of the polymers which may vary the solubility thereof. The amount of solvent may be from about ½ to 50% by weight but is preferably from 5 to 10% by weight of the composition if a solvent is used.

The polymer composition may also contain additional materials such as dyes, pigments and other polymeric materials in small proportions. The additional polymeric substances may be soluble in the aqueous composition but the amount thereof should not be so high as to impart excessive viscosity (i.e., over about 30 cps.) in the composition as it is applied. The use of a dye or pigment is sometimes desirable to reduce the number of subsequent finish coatings when a colored leather is to be produced. The proportion of pigment, however, should not be enough to hinder the entry and penetration of the polymer composition into the grain side of a full grain or buffed leather and thus prevent the complete penetration of the polymers through the thickness of the corium minor. In general, the amount of pigment should not exceed 5 parts per 100 parts by weight of the composition used for impregnation.

The impregnation is effected by application to one side only of the leather. In the case of grain leathers, whether full grain or buffed, the application is generally made to the grain side only though in the case of shearlings, application solely to the flesh side should be made. In the case of grainless split leathers, similar effects are obtained whether the impregnation is made on one side or the other.

The polymer composition may be applied in any fashion provided it is applied to one side only under such conditions that the proper amount of composition and/or time is available for the appropriate extent of penetration before extensive drying of the composition occurs.

In the case of full grain or buffed leathers, the composition may be swabbed on or it may be applied by brushing on the grain surface of the leather. The swabbing, brushing, or wiping action employed is extended in duration as the means to assure adequate penetration and deposition, that is to the juncture of the corium minor with the corium major, and for this purpose, the normal equipment that is used simply for coating leather is ordinarily inadequate, since such equipment involves a mere brushing to spread the coating evenly over the surface followed substantially immediately by drying. For the purpose of accomplishing the impregnation by a brushing operation, it is necessary that the brushing be continued for a comparatively extended period of time while the impregnating material is applied to the surface of the leather and maintained thereon in wet condition. Thus, an extended period of concurrent application and brushing should be carried out to prevent the drying of the material on the surface before extensive penetration can be accomplished.

Thus, in accordance with the present invention, full grain and/or buffed leather is impregnated with the polymer composition in such manner that the entire corium minor is penetrated and a substantial amount of polymer is deposited within the corium minor and at the junction of the corium minor and the corium major. The results obtained with the preferred copolymers which contain polar groups are outstanding in durability apparently because these polymeric substances adhere the corium minor layer to the corium major therebeneath more strongly than polymers lacking the polar groups. The treatment of these leathers from the grain side by the present invention thus involves substantially complete penetration of the corium minor and involves considerable permeation or penetration of the polymer through all of the areas of the corium minor and not merely the filling of the hair follicles and openings to the sebaceous glands.

In the case of impregnating split leathers or the flesh side of shearlings, the dispersion is generally applied under conditions such that penetration of about 15 to about 45% of the thickness, and preferably about 15 to about 35% of the thickness occurs. However, in the case of shearlings, the penetration may extend completely through the corium major to, but not appreciably beyond, the juncture thereof with the corium minor. Since the surface of the leather to be impregnated, and later finished, is in this case much more open to impregnation than the surface of full-grain, snuffed or buffed leathers, the composition may be simply sprayed on the face of the leather or lightly swabbed, wiped or brushed on, the amount applied being limited so that penetration will extend through at least about 15% of the thickness but not exceed about 45% and preferably not exceed about 35% of the thickness. At least about 90% of the polymer incorporated into the body of the leather should be distributed in the zone extending from the surface through which the polymer composition is applied to a depth of at least 15%, but not over about 45%, of the thickness of the leather. The penetrability of the composition can be regulated by adjusting the content of polymer, solvent and, when used, surface active or emulsifying agent.

A penetration of at least 15% of the thickness of the leather is required. A small amount of penetration of less than five to eight percent of the thickness of the leather is worse than no treatment and results in a very coarse break which is undesirable.

When impregnating either the flesh side of any leather or a split leather, care should be taken, by limiting the amount of composition applied or other conditions of application, to avoid penetration and deposit of the dispersed polymer in any substantial amount in more than about 45% of the thickness of the leather. Impregnation of the entire thickness of the leather or "saturation" must be avoided in the present process because in addition to the substantially greater cost of materials involved, in total thickness impregnation the natural characteristics of the leather are seriously impaired. For instance, it is desirable that shoe upper leather be capable of absorbing perspiration vapor and allowing its dissipation to the outside of the shoe. For this purpose high quality shoe upper leather has absorptive qualities and vapor permeability and these characteristics are inhibited little if any by the process of partial impregnation in accordance with the present invention, whereas saturation impregnation of total thickness with polymer markedly reduces the moisture absorptive property and vapor permeability of the leather. Also, the leather temper is lost and the impregnated leather becomes like a sheet of plastic when impregnated throughout its thickness.

The non-impregnated thickness of the leather product of the present invention is substantially free from the polymers so that its vapor permeability and flexibility is not substantially affected by the treatment. It is believed that this is one of the reasons why the overall vapor permeability and flexibility of the treated product throughout its entire thickness is not reduced to such an extent as to make the product unsitable for use as shoe uppers as is the case when the entire leather thickness is impregnated with the polymer composition of the present invention. However, it will be appreciated that comparatively small quantities of polymer may be present in the remaining thickness of the leather without reducing the natural flexibility and vapor permeability thereof sufficiently to make the overall flexibility and vapor permeability unsatisfactory. For example, the leather may have small holes or cuts passing from the grain surface into the flesh layer through which the dispersion flows when it is applied to the grain surface. Consequently, when it is stated herein that the remaining thickness of the leather is "substantially free from said polymers" it is meant that such remaining thickness does not contain a sufficient amount of the polymers to materially modify the natural properties including the temper of the leather and it is not intended by such term to exclude small quantities of the polymers in such remaining thickness which are insufficient to reduce the vapor permeability and flexibility properties thereof to a degree which will render the overall flexibility and permeability of the leather product unsuitable for the purposes set forth.

More or less of the polymers may be left as a coating upon the leather at the end of the impregnation process depending upon the particular manner of effecting the impregnation. However, whether or not a substantial amount of polymer material is left on the surface, it is essential, in the case of full grain and buffed leathers, that the polymers be forced to penetrate through the corium minor or grain layer and to deposit the polymer within the entire thickness thereof, and at the junction of the corium major. In the case of split leathers and impregnation of the flesh side of any leather, the impregnation should extend through about 15% but not over about 45%, and preferably not over about 35% of the thickness of the leather. In the case of shearlings, however, the deposition of the polymers may occur throughout the corium major. Although it is not essential to follow the impregnation treatment of the present invention with a finishing treatment involving the application of one or more coats of a finishing composition, it is generally preferred to provide such a finishing treatment.

The impregnation may be effected at room temperature or at somewhat elevated temperatures up to 45 to 50° C. After deposition of the polymers within the body of the leather, the leather is subjected to a drying step. This may be carried out at room temperature or it may be accelerated by heating to somewhat elevated temperatures such as at about 60 or 70° C. On drying, the water and any organic solvent present is volatilized, leaving the dry mixture of polymers within the body of the leather.

The impregnation of the present invention is adapted to be applied to any type of leather such as that obtained from the skins of calves, cattle, goats, sheep, horses, and regardless of the particular manner of tanning. Thus, the leather may be that obtained by chrome tanning, zirconium tanning, vegetable tanning, or tanning by the use of synthetic tanning agents. At the time of the application of the impregnation, the leather should generally be that obtained after the drying of the tanned, dye, and/or fat-liquored leather.

The invention is, as stated, applicable to full-grain leathers, but more particularly it is suited to snuffed or buffed grain leathers and improves the break characteristic of leathers of these types, as well as improving the resistance to scuffing and abrasion. It also renders the subsequently finished leathers more readily repaired if any scuffing penetrates through the finish coats.

The impregnation treatment of the present invention improves the break, the filling, and, when the preferred compositions which are film-forming at the temperature of application, the resistance to abrasion and scuffing of the leather, without detrimental loss of leather temper. The improvement is such that even with tanned leathers of poor quality, impregnated leathers of high quality can be obtained that are suitable for use as shoe uppers, shoe linings, handbags, belts, garments, gloves, luggage, footballs, baseballs, bookbindings, upholstery and other related uses. The improvement in the break referred to is so outstanding that inferior grades of leathers which command a low price because they ordinarily cannot be finished into high quality leather having good break characteristics can be treated by the present invention and converted into high quality leathers having good characteristics as far as break is concerned. In other words, the present invention serves to upgrade leathers, whether the inferiority of the leather treated is that inherent in the particular hide from which the leather was produced or that resulting from the tanning and/or other operations by which it was produced. Because of this capacity of the present invention, it may be applied to many types of leathers which are ordinarily of such inferior grade that they have been discarded or used only as so-called "offal" leathers. When applied to such poor-grade materials, the finished leathers that can be obtained are so improved in quality that they can be used for the making of shoes, uphosltery, bags, belts, briefcases, etc., where high-grade leathers are needed. In addition, sufficient filling action is provided by the polymer to firm the loose areas such as bellies and flanks of the leather so that more of these articles of commerce can be obtained from the leather than would otherwise be possible.

After application of the impregnation, whether or not it involves the leaving of any of the polymer material on the surface, the leather may be, and preferably is, finished by the application of one or more coatings. This subsequent coating may be formed of any polymeric or other material normally employed for leather finish coatings. It may, of course, be pigmented, dyed, or not, as desired. Conventionally used finishing materials such as nitrocellulose lacquers or aqueous dispersions or organic solvent solutions of vinyl or acrylic polymers have been found suitable for finishing such impregnated leathers.

The process of the present invention is adapted to produce leathers having improved break and scuff resistance either under acid or alkaline conditions of pH. In some instances, it is advantageous to use an acid system rather than an alkaline aqueous medium. The choice depends on the character of the leather, particularly its surface charge and how this is affected by pH. By using mixed systems such as the subject compositions of this invention, sufficient flexibility is obtained to choose compositions that will work at any decided pH range.

The impregnated leathers obtained by the process of the present invention are generally characterized by a mellower and more natural feel and temper than those obtained by impregnation with polymer solutions. As is apparent from the description of the invention hereinabove, the leather is impregnated through a definite part of its thickness only.

This cannot be accomplished by effecting the impregnation in a drum. Drumming causes penetration from all surfaces and of course favors penetration from the flesh side which in the case of full grain and buffed leathers is not the side to be finished.

In the following examples which are illustrative of the invention, the parts and percentages are by weight unless otherwise indicated.

*Example 1*

An impregnating composition was prepared of an aqueous composition of an emulsion copolymer of 98% by weight of ethyl acrylate and 2% by weight of methacrylic acid, the dispersed particles of which had a surface average radius of about 800 angstrom units and of a water-soluble ammonium salt of a copolymer of 92.5% by weight of ethyl acrylate and 7.5% by weight of methacrylic acid. The composition had a pH of about 7.5, a viscosity of about 5 cps. and contained about 5% by weight of the water-insoluble dispersed copolymer, about 5% by weight of the water-soluble copolymer, about 2% of tert-octylphenoxpolyethoxyethanol having about 10 oxyethylene groups, about 0.2% of sodium lauryl sulfate, about 0.25% of octylphenoxypolyethoxyethanol containing an average of about 38 oxyethylene units per molecule and about 10% by weight of 2-methoxyethanol.

This composition was then applied by swabbing to the grain side of an air-dry buffed side leather which had been chrome tanned, vegetable-retanned and fat-liquored but had not been finished. The swabbing operation was done by dipping the swab into the impregnat, swabbing one square foot of the leather with the soaked swab, dipping the swab back into the impregnant and swabbing again over the same area as rapidly as possible while it was still wet, dipping the swab into the impregnant a third time, and again wiping it over the same area while it was still wet with the second swabbing. This was repeated on other areas until the whole side of the leather was treated. A section was untreated so that comparisons could be made.

The leather was hung to dry for three hours at 55° C. in a slowly moving current of dry air. Then it was plated with a sandblast plate in a press at 150° F. and 2500 lbs. per square inch pressure. Examination of the leather showed a significant improvement in break and in scuff resistance both before and after the plating step.

*Example 2*

Example 1 was repeated except that the concentration of the polymer composition was either reduced by dilution with water or prepared with less water so that the polymer solids is 5%, 15% and 18% respectively. Good break improvement resulted in each case. The scuff resistance improved progressively with increasing concentrations.

*Example 3*

Example 1 was repeated except that the ratio of water-insoluble copolymer to water-soluble copolymer was varied to provide 20 parts insoluble copolymer to 80 parts water-soluble copolymer in one instance and 80 parts insoluble copolymer to 20 parts water-soluble copolymer in another run. The finished leather exhibits good scuff-resistance and good break improvement.

*Example 4*

Example 1 was repeated except that the impregnating composition also contains 1% of polyoxyethylated castor oil containing an average of about 60 oxyethylene units. The finished leather exhibits good scuff-resistance and good break improvement.

*Example 5*

Example 1 was repeated except that the impregnating composition also contains 1% of castor oil. The finished leather exhibits good scuff-resistance and good break improvement.

*Example 6*

Example 1 was repeated except that ¼% of Nigrosine Jet Black WSV (C.I. No. 865) was added to the impregnating composition. The finished leather exhibits good scuff-resistance and good break improvement.

*Example 7*

Example 1 was repeated except that ammonium hydroxide was added to adjust the pH of the mixture at a pH value of 9.0. The finished leather exhibits good scuff resistance and good break improvement.

*Example 8*

Example 1 was repeated except that the water-soluble copolymer was replaced with a mixture of 3% of a water-soluble copolymer containing 90 parts by weight of butyl acrylate and 10 parts by weight of methacrylic acid and 2% of a water-soluble polyvinyl alcohol. The finished leather exhibits good scuff-resistance and good break improvement.

*Example 9*

Similar improvement in the break and in the scuff-resistance of the leather was obtained when Example 1 was repeated except that the water-insoluble polymer dispersion was replaced with a mixture of 3% of an emulsion copolymer of 86% ethyl acrylate, 10% of acrylonitrile, and 4% of butyl acrylate having a surface average radius of about 700 angstrom units and 2% of an emulsion copolymer of 80% ethyl acrylate, 18% methyl methacrylate, and 2% methacrylic acid having a surface average radius of about 1800 angstrom units.

Example 10

Similar improvements in break and scuff-resistance were obtained when Example 1 was repeated with each of the following compositions:

(a) An aqueous composition having a pH of about 4.0 and containing 8% by weight of an emulsion copolymer of 90% ethyl acrylate and 10% of acrylonitrile having a surface average radius of 800 angstrom units and 2% by weight of a water-soluble polymer of polydimethylaminoethylmethacrylate. The composition contained 1% sulfated castor oil, 2% of an octylphenoxypolyethoxyethanol having an average of 10 oxyethylene units and 10% ethyl alcohol, the percentages being based on the entire weight of the impregnating composition.

(b) An aqueous composition having a pH of about 5.0 and containing 10% of an emulsion copolymer of 49% of ethyl acrylate, 49% of butyl acrylate and 2% itaconic acid and 2% of a water-soluble polyvinyl alcohol. The particle size of the emulsion copolymer was about 1000 angstrom units. The composition contained 1% sodium lauryl sulfate and 3% sodium octylphenoxyethyl sulfate.

(c) An aqueous composition having a pH of about 4.0 and containing 5% by weight of an emulsion copolymer of 95% ethyl acrylate and 5% of N-vinyl pyrrolidone, the polymer particles having a surface average radius of 900 angstrom units and a 2% by weight of a water-soluble copolymer of 50% ethyl acrylate and 50% N-vinylpyrrolidone. The composition contained 0.25% benzyldimethylstearylammonium chloride, 1% octylphenoxy-polyethoxyethanol having an average of 39 oxyethylene units, and 2% of another having an average of 10 oxyethylene units, the percentages being based on the weight of impregnating composition.

(d) An aqueous composition having a pH of 8.0 and containing 7% of an emulsion copolymer in which a mixture of butylacrylate and methacrylic acid is grafted on a copolymer of vinylidene chloride with butyl acrylate and ethyl acrylate, the proportions of the various monomers being 43% butyl acrylate (in the first-mentioned mixture), 1% methacrylic acid, 50% vinylidene chloride, 3% butyl acrylate (in substrate copolymer) and 3% ethyl acrylate and the particles of the polymer had a surface average radius of about 900 angstrom units. The aqueous composition contained 3% of a water-soluble copolymer of 65 parts ethyl acrylate, 20 parts 2-ethylhexyl acrylate and 15 parts methacrylic acid, the percentages being based on the weight of impregnating composition.

(e) An aqueous composition having a pH of about 4.0 and containing a 10% by weight polymer emulsion prepared with ammonium persulfate as a catalyst and containing a copolymer of 85 mole percent of butyl acrylate and 15 mole percent of methacrylic acid. In contrast to the high molecular weight of the preceding polymer emulsion (in the millions), the polymer emulsion had a molecular weight which was quite low being about 20,000 to 40,000 viscosity average and the particles had a surface average radius of 1100 angstrom units. The composition contained 2% by weight of polyvinyl alcohol solution polymers and contained 1% of polyoxyethylated vegetable oil having an average of 40 oxyethylene units and 2% of sulfated octylphenoxyethyl, the percentages being based on the weight of impregnating composition.

(f) An aqueous composition having a pH of about 7.5 and containing 3% by weight of an emulsion polymer of ethyl acrylate having a surface average radius of about 2100 angstroms and 10% by weight of a solution copolymer of 90 parts ethyl acrylate and 10 parts methacrylic acid. The composition contained 0.25% oleylsulfate and 35% ethyl alcohol, the percentages being based on the entire weight of impregnating composition.

Example 11

One heavy spray coat of the following composition was applied to one face of a split leather and to the flesh side of a shearling. The composition had a pH of about 7.5 and contained 10% of an emulsion copolymer of 75% of ethyl acrylate, 23% of butyl acrylate, and 2% of methacrylic acid having a surface average radius particle size of about 1800 angstrom units and 10% of a water-soluble copolymer of 93% ethyl acrylate and 7% methacrylic acid. Based on the weight of the impregnating composition, the composition contained 0.1% sodium oleyl sulfate, 2% of octylphenoxypolyethoxyethanol having an average of about 10 oxyethylene units and 10% ethyl alcohol. After spraying, the leather was hung to dry for three hours at 55° C. in a slowly moving current of dry air. The impregnated surfaces were then finished and the finished leather showed improved pull-up characteristics, good fill and fiber bonding and good layout, improved resistance to scuffing and improved break characteristics. The temper of the leather was not adversely affected.

Example 12

Example 11 was repeated except that the pH of the composition was about 4.0 and it contained 15% by weight of an emulsion copolymer of 86% ethyl acrylate, 10% of acrylonitrile and 4% butyl acrylate and the polymer particles had a surface average radius of about 1000 angstrom units. The water-soluble copolymer was replaced with 5% of polydimethylamino ethyl methacrylate.

Example 13

Example 11 was repeated except that the pH of the composition was about 9.0 and the water-soluble copolymer was replaced with a water-soluble copolymer of 97% ethyl acrylate and 3% methacrylic acid neutralized with dimethylaminoethanol.

Example 14

Example 11 was repeated except that the pH of the composition was adjusted to about 4.5 and the water-soluble copolymer was replaced with a water-soluble copolymer of 30% acrylamide, 30% butyl acrylate and 40% ethyl acrylate.

We claim:

1. A process for treating leather which comprises applying to the leather, fully tanned and fat-liquored and in air-dry condition, on one side only an aqueous composition having a pH of about 4 to 9, and containing at least about 5% by weight up to about 25% by weight of a mixture of (1) a water-soluble polymer of monoethylenically unsaturated molecules comprising at least about 3% by weight of at least one monomer containing a hydrophilic group, and (2) a water-insoluble linear addition polymer of monoethylenically unsaturated molecules, the dispersed particles of the insoluble polymer having a surface average radius between about 250 and about 2200 angstroms, the weight ratio of the soluble polymer to the insoluble polymer being from 15:85 to 85:15, the impregnation being effected to distribute at least 90% of the polymer material deposited in the leather through at least about 15% but not over about 45% of the thickness of the leather, and the amount of polymer deposited being from about 0.7% to 12% by weight, based on the weight of air-dry leather.

2. A process as defined in claim 1 in which the impregnating composition is applied only to the grain side and the impregnation is effected to penetrate through the corium minor and to deposit polymer down to the junction of the corium minor with the corium major.

3. A process as defined in claim 1 in which the impregnating composition is applied only to the flesh side of a shearling and the impregnation is effected to penetrate through the corium major and to deposit polymer down to the junction of the corium major with the corium minor.

4. A process as defined in claim 1 in which the impregnating composition is applied only to one side of a split leather and the impregnation is effected to deposit polymer substantially only in that portion of the thickness of the leather extending from the aforesaid side to a depth from about 15% to not over about 45% of the total thickness of the leather.

5. A process according to claim 1 in which the polymers are acrylic polymers containing polymerized units of at least one ester of an acid of the formula

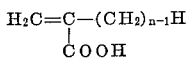

in which $n$ is an integer having a value of 1 to 3, with a saturated aliphatic monohydric alcohol having 1 to 18 carbon atoms.

6. A process according to claim 1 in which the water-insoluble polymer is a copolymer of 0.5 to 15% by weight of an acid selected from the group consisting of acrylic acid, methacrylic acid, and itaconic acid and at least 85% by weight of at least one ester of an acid of the formula

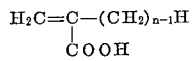

where $n$ is an integer having a value of 1 to 3, with an alkanol having 1 to 18 carbon atoms.

7. A process according to claim 1 in which the water-insoluble polymer is a copolymer of ethyl acrylate and 0.5 to 4% weight of methacrylic acid, acrylic acid, or itaconic acid.

8. A process for treating leather which comprises applying to a full-grain leather, fully tanned and fat-liquored and in air-dry condition, on the grain side only an aqueous composition having a pH of about 4 to 9, and containing at least about 5% by weight up to about 25% by weight of a mixture of (1) a water-soluble polymer of monoethylenically unsaturated molecules comprising at least about 3% by weight of at least one monomer containing a hydrophilic group, and (2) a water-insoluble linear addition polymer of monoethylenically unsaturated molecules, the dispersed particles of the insoluble polymer having a surface average radius between about 250 and about 1300 angstroms, the weight ratio of the soluble polymer to the insoluble polymer being from 15:85 to 85:15, the impregnation being effected to distribute at least 90% of the polymer material deposited in the leather through at least about 15% but not over about 45% of the thickness of the leather, and the amount of polymer deposited being from about 0.7% to 12% by weight, based on the weight of air-dry leather.

9. A process as defined in claim 8 in which the water-soluble polymer is a salt of a copolymer of an ester of acrylic acid and about 5 to 55% by weight of an acid selected from the group consisting of acrylic acid, methacrylic acid, and itaconic acid.

10. A process as defined in claim 9 in which the water-soluble polymer is a salt of a copolymer of an ester of acrylic acid and about 5 to 55% by weight of an acid selected from the group consisting of acrylic acid, methacrylic acid, and itaconic acid, and the water-insoluble polymer is a polymer of an ester of acrylic acid with an alkanol having 1 to 8 carbon atoms.

11. A process as defined in claim 8 in which the water-soluble polymer component comprises a polyvinyl alcohol.

12. A process as defined in claim 8 in which the water-soluble polymer component comprises a polymer of dimethylaminoethyl methacrylate.

13. A process as defined in claim 8 in which the water-soluble polymer component comprises a polymer of N-vinylpyrrolidinone.

14. A process as defined in claim 8 in which the water-soluble polymer component comprises a polymer of N-vinylpyrrolidinone and the water-insoluble polymer is a copolymer of N-vinylpyrrolidinone.

15. A process as defined in claim 8 in which the water-insoluble polymer is a copolymer of acrylonitrile and an ester of acrylic acid.

16. A process as defined in claim 8 in which the water-insoluble polymer is a copolymer of vinylidene chloride and an ester of acrylic acid.

17. A process as defined in claim 9 in which the water-soluble polymer is a salt of a copolymer of an ester of acrylic acid and about 5 to 55% by weight of an acid selected from the group consisting of acrylic acid, methacrylic acid, and itaconic acid, and the water-insoluble polymer is a copolymer of an ester of acrylic acid with an alkanol having 1 to 8 carbon atoms, with a small amount of an acid selected from the group consisting of acrylic acid, methacrylic acid, and itaconic acid.

References Cited by the Examiner
UNITED STATES PATENTS

| | | | |
|---|---|---|---|
| 2,126,321 | 8/1938 | Freudenburg | 117—142 X |
| 2,204,520 | 6/1940 | Walker et al. | 117—142 X |
| 2,744,836 | 5/1956 | Schubert et al. | 117—142 |
| 2,828,220 | 4/1958 | McWherter et al. | 117—142 X |
| 2,828,222 | 4/1958 | Kine et al. | 117—76 |
| 2,865,877 | 12/1958 | Hatton et al. | 117—161 X |
| 2,923,646 | 2/1960 | Jordan | 117—161 X |
| 3,048,496 | 8/1962 | Buechler et al. | 117—142 X |
| 3,103,447 | 9/1963 | Lowell et al. | 117—142 X |

WILLIAM D. MARTIN, *Primary Examiner.*

T. G. DAVIS, *Assistant Examiner.*